United States Patent [19]

Hunter

[11] 4,106,208
[45] Aug. 15, 1978

[54] METHOD OF AND APPARATUS FOR DETERMINING VEHICLE WHEEL ALIGNMENT

[76] Inventor: Lee Hunter, 13501 Ladue Rd., Ladue, Mo. 63141

[21] Appl. No.: 675,347

[22] Filed: Apr. 9, 1976

[51] Int. Cl.² ............... G01B 07/315; G01B 19/295; G01B 11/275
[52] U.S. Cl. .................................. 33/288; 33/203.18
[58] Field of Search .......... 33/203.14, 203.15, 203.16, 33/203.18, 203.19, 288

[56] References Cited

U.S. PATENT DOCUMENTS

| | | | |
|---|---|---|---|
| 2,601,262 | 6/1952 | Carrigan | 33/203.15 |
| 2,972,189 | 2/1961 | Holub | 33/203.18 |
| 3,091,862 | 6/1963 | MacMillan | 33/203.18 |
| 3,135,052 | 6/1964 | MacMillan | 33/288 |
| 3,164,910 | 1/1965 | Manlove | 33/203.18 |
| 3,337,961 | 8/1967 | Holub | 33/203.18 |
| 3,426,438 | 2/1969 | Wilkerson | 33/203.18 |
| 3,782,831 | 1/1974 | Senften | 33/288 |
| 4,034,479 | 7/1977 | Senften | 33/203.15 |

FOREIGN PATENT DOCUMENTS 551,283  11/1956  Italy ........................................... 33/288

*Primary Examiner*—Richard E. Aegerter
*Assistant Examiner*—Richard R. Stearns
*Attorney, Agent, or Firm*—Gravely, Lieder & Woodruff

[57] ABSTRACT

Vehicle wheel alignment determining apparatus having a preferred method of use in which alignment determining components on the front wheels are operative to find wheel toe characteristics, center point steering and wheel set back, and wherein such components are applicable also to the rear wheels for finding set back, wheel tracking and characteristics related to the front wheel alignment.

5 Claims, 8 Drawing Figures

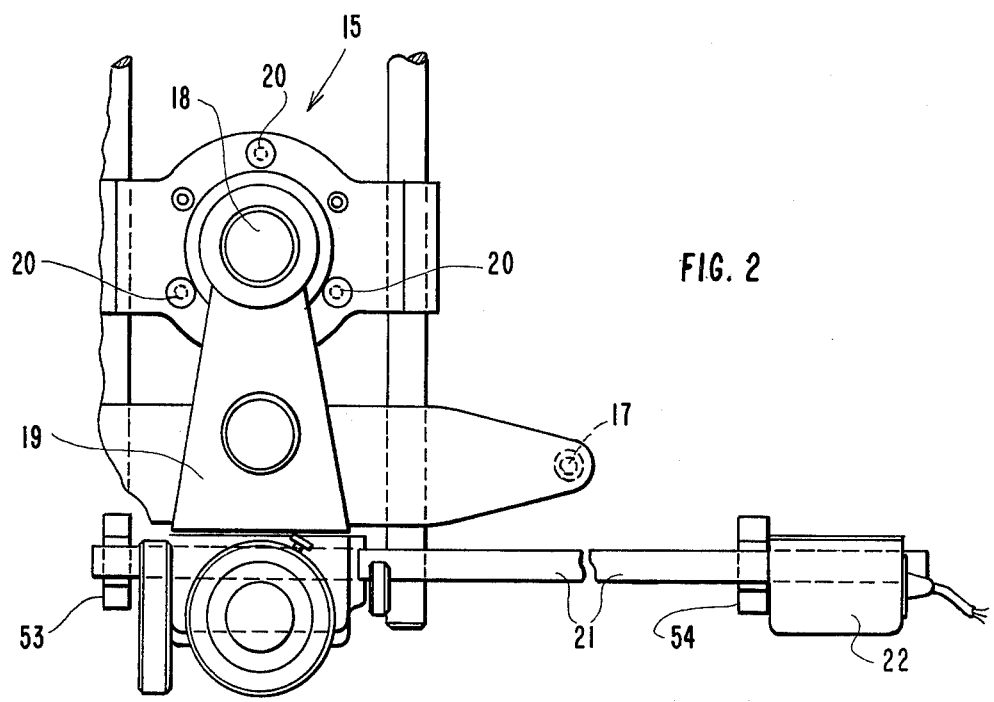
FIG. 2
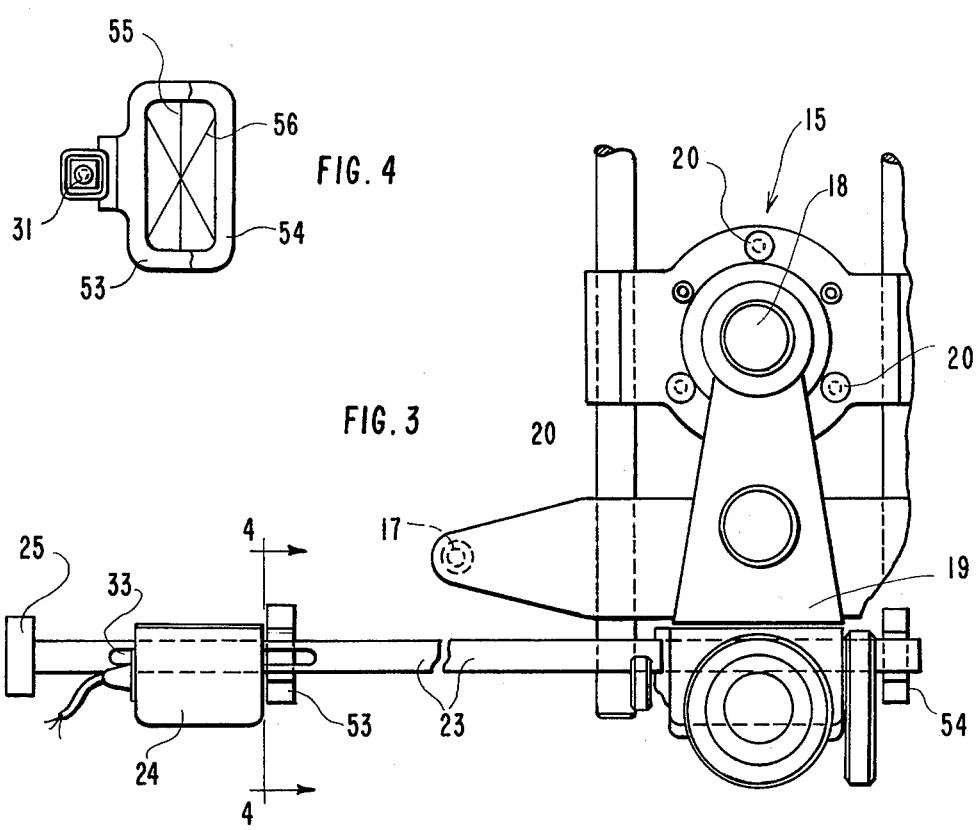
FIG. 4
FIG. 3

METHOD OF AND APPARATUS FOR DETERMINING VEHICLE WHEEL ALIGNMENT

BACKGROUND OF THE INVENTION

Proper alignment of vehicle wheels is well recognized as being important to safe operation and correct performance according to the makers specification. Heretofore, means to determine wheel alignment has included mechanical tie-in between steerable wheels with read-out dial means or with electrically responsive signalling devices such as lights or buzzers. In some instances visual sighting means has been related with the vehicle wheels to determine limited alignment characteristics.

The problems with such prior means has been that it is difficult for service operators to obtain readings in a short time for what can be a relatively simple operation. Other problems have existed, such as the high cost of alignment determining apparatus, apparatus that can easily be misused or does not retain the original accuracy, or apparatus that is difficult to use because of the way it must be installed and operated. Some prior devices are incapable of determining certain wheel alignment characteristics that are important to overall alignment determination and correction.

It is evident that in some instances vehicles are assembled in haste which can result in alignment errors, or are not always checked to determine whether the wheel alignment geometry is correct or within acceptable tolerances. Vehicles with wheels out of alignment can be spotted while in motion by noting whether the front and rear wheel track. Improper wheel toe is not as easily visually noted, but can be found by noting tire wear and handling response.

SUMMARY OF THE INVENTION

This invention relates to improvements in methods of and apparatus for determining alignment characteristics of vehicle wheels, and especially wheel toe, center point steering, wheel setback and wheel tracking.

The operation of vehicles is greatly facilitated, from the operators view point, when the steerable wheels are maintained within the toe alignment specified by the maker, and when the steering wheel is substantially centered to the longitudinal center line so the operator will know or sense when the wheels are in a straight ahead position. Toe-in and center point steering are closely related for the reason that when the steerable wheels are properly toed-in they will tend to hold the vehicle to movement parallel to its longitudinal axis which establishes a straight ahead line of travel, and in this condition the steering wheel is found to be in a position where the wheel spokes or cross bar is positioned normal to or symmetrical, called "centered", with the longitudinal center line of the vehicle. On the other hand, if the front wheels do not have the axis of rotation aligned and perpendicular to the longitudinal axis of the vehicle, the vehicle will not run with the front and rear wheels tracking each other. A similar condition can be encountered if the mounting, whether a solid axle or independent suspension, for the rear wheels is not perpendicular to the longitudinal axis. Both of these conditions are known as set back which means one front or rear wheel of a set of wheels is out of alignment with the wheel on the other side of the set.

After a period of operation wheel toe-in alignment changes which increases tire wear and can also cause the steering wheel to shift from a symmetrical setting or from a setting comfortable to the driver. Common causes of toe-in changes are running over curbs, hitting holes or sharp depressions, pinching one wheel against a curb or some immovable object, or loosening of the tie rod adjustment sleeves. When the toe-in changes occur the vehicle steerable wheels will assume a running position where the toe-in tends to equalize at the wheels, and this throws the steering wheel out of its center point alignment and causes the vehicle to travel with the wheels out of tracking alignment. Tire wear is accelerated and driver fatigue is increased.

It is an important object of this invention to provide apparatus that will make it easy to determine toe-in alignment as well as centered or center point steering, and to make it easy to check and restore alignment characteristics to the manufacturers specification.

It is also an important object of this invention to provide apparatus that will account for variations in the alignment positions of vehicle wheels, such as front wheel or rear wheel set back in which one wheel is ahead of the other when measured from the longitudinal center line of the vehicle.

Still another object of this invention is to provide low cost electro-mechanical alignment apparatus involving means amenable to vehicle wheel alignment measurements, whereby mechanical means may be employed with electrical sensing and read-out means to achieve greatly improved accuracy of determining wheel alignment characteristics.

The invention, as applied to a vehicle having single or dual wheel sets comprises indicia bearing target scales adjacent a first set or pair of wheels set to face toward the second set or pair of wheels, sighting means adjacent the second pair of wheels directed to read the indicia on the target scales, wheel position measuring means carried by each wheel of the second pair and being interconnected to work together to establish an alignment reference therebetween, and display or other means responsive to the wheel positions such that wheel toe, center point steering, set back and tracking of the wheels can be determined.

The invention also resides in a method of determining the alignment of the steering wheel and front and rear wheel sets of a vehicle which consists in adjusting the front wheel set into a substantially straight ahead position relative to the longitudinal axis of the vehicle, providing means to monitor the front wheel alignment while adjusting the same, utilizing the monitoring means to find the presence of front wheel set back, if any, adjusting the steering wheel to centered position, further adjusting the front wheels into the desired toe alignment by observing the monitoring means, determining the rear wheel set tracking alignment relative to the front wheel set by evaluating the condition of symmetry of the rear wheels relative to the front wheels, and utilizing the monitoring means at the rear wheels to determine rear wheel toe relative to the longitudinal axis of the vehicle and rear wheel set back.

BRIEF DESCRIPTION OF THE DRAWINGS

The embodiments of this invention presently preferred are shown in the accompanying drawings, wherein:

FIG. 2 is a fragmentary side view of the adapter means and toe measuring device for the right front wheel, the view being taken along line 2—2 in FIG. 1;

FIG. 3 is view similar to FIG. 2, but showing the toe measuring device for the left front wheel, the view being taken along line 3—3 in FIG. 1;

FIG. 4 is a fragmentary view of the sighting frames for the assembly of FIG. 3, the view being taken at line 4—4 in FIG. 3;

DETAILED DESCRIPTION OF THE EMBODIMENTS

Figure 1:
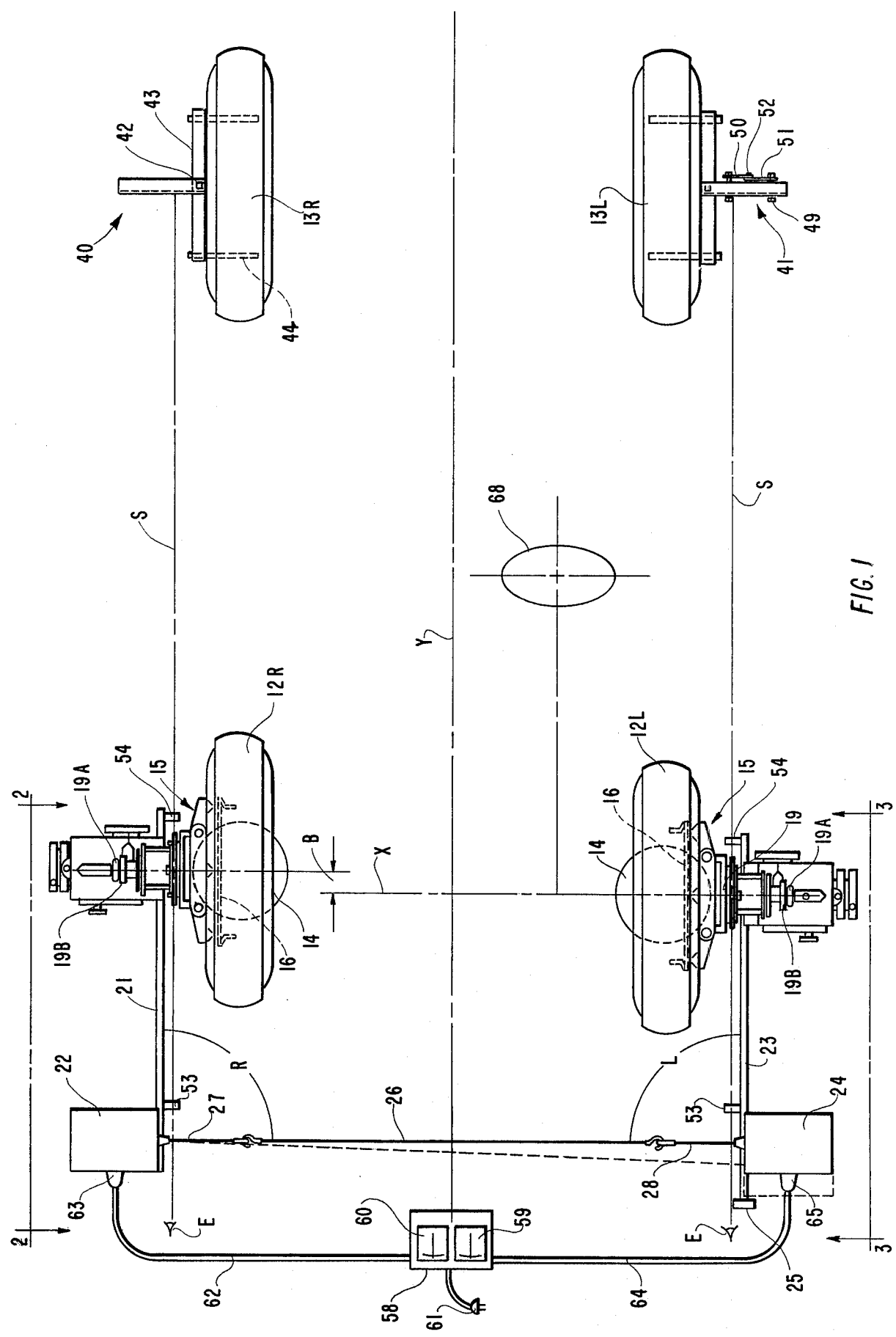
FIG. 1 is a schematic plan view of the wheel positions for a four wheel vehicle and the various components of the apparatus are shown in operative association with the vehicle wheels.

The vehicle, represented in FIG. 1 by a set or pair of steerable front wheels 12R and 12L and a set or pair of rear wheels 13R and 13L, is driven onto a suitable service area so its front wheels come to rest on turn plates 14. While turn plates 14 are useful to make it easy to turn the steerable wheels in or out, they are not necessary. If the service area is equipped with a hoist or rack, the vehicle is placed on that type of equipment so it may be lifted off its wheels when necessary.

A first step in determining wheel alignment characteristics is to mount the monitoring instrument adapters 15 (FIGS. 1, 2 and 3) on the wheel rims 16 by engaging the rim gripping elements, one being shown at 17, but usually at least three such elements are provided. The adapters are similarly constructed and have a spindle 18 for pendulously supporting instrument heads 19 having run-out compensating knobs 20 which can be adjusted so that spirit levels in the heads 19 remain substantially centered while the wheels 12R and 12L are rotated. This places the heads 19 in the plane of wheel rotation, and monitoring instruments carried by these heads will be similarly located.

Figure 7:
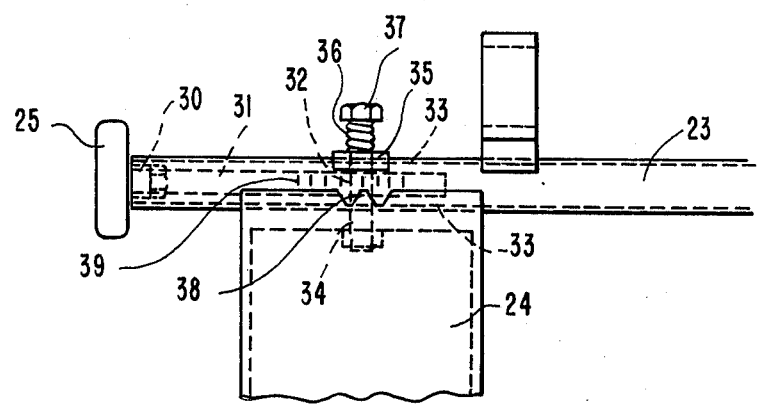
FIG. 7 is an enlarged and fragmentary view of the means for adjusting the position of the monitoring device for the left front wheel to determine wheel alignment, and also set back.

The head 19 for the right front wheel 12R (FIGS. 1 and 2) is provided with a first member or support bar 21 which projects forwardly so its outer end is clear of the wheel 12R. A first wheel alignment monitoring device in box 22 is fixed on the outer end of bar 21 facing the opposite wheel 12L. The head 19 for the left front wheel 12L (FIGS. 1 and 3) is provided with a first member or support bar 23 which like the first member 21 also projects forwardly to clear the wheel 12L. A second wheel alignment monitoring device in the box 24 is carried by this bar 23 to face the opposite box 22, but it is mounted to be adjustable along the bar 23 by an adjusting knob 25 (FIG. 7). These boxes are located to be in the clear space forward of the wheels. Each box 22 and 24 may house the monitoring means disclosed in the copending application of Senften, Ser. No. 675,332, filed Apr. 9, 1974, now U.S. Pat. No. 4,034,479, granted Apr. 14, 1977, in which case there is an elastic cord 26 placed across this space to interconnect with second members or pig tails 27 and 28 extending outwardly from the boxes. It may be preferred to dispense with the cord 26 and the attaching pig tails 27 and 28, in which case monitoring means in the form of members projecting light beams, all as shown in U.S. Pat. No. 3,782,831 issued Jan. 1, 1974 may be used. Whether the monitoring means is interrelated by a cord 26 or by a light beam, it is to be understood that these provisions are equivalent, as either one will make it possible for the service operator to know what is taking place. In the view of FIG. 1, the portions of an interrupted reference line X are drawn so as to be perpendicular to the longitudinal axis Y for the vehicle. Due to the need to show wheel set back, for illustrating purposes, the reference line X is broken into two portions separated by the set back B which has been exaggerated.

Referring to FIG. 7, the bar 23 is square in section and hollow. The outer open end receives a captive bearing 30 which supports a screw shaft 31 so this shaft can be turned in place. The screw shaft 31 extends into the hollow bar 23 and threaded engages a nut 32 which can be slid along the bar by turning the knob 25. The opposite sides of the bar 23 are slotted at 33 so that a shaft 34 may be extended from the box 24 through the near slot 33, nut 32 and the far slot 33. The outer end of the shaft 34 carries a slide shoe 35, a pressure spring 36 and a cap nut 37. When knob 25 is turned the box 24, shaft 34 and slide shoe 35 will be caused to move relative to the bar 23, thereby changing the distance between the viewing axis of box 24 and the reference line X. The spring 36 will press on the shoe 35 and retain the box 24 in its moved position, while a pointer 38 on the box will point to the scale indicia 39 to provide a reading of the amount of movement. The purpose for the indicia 39 and the adjusting knob 25 and its components will appear presently.

Figure 5:
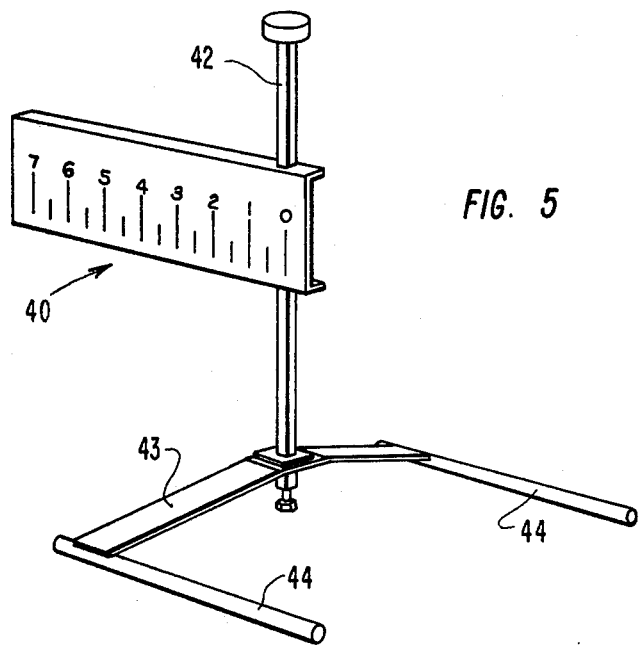
FIG. 5 is a perspective view of the target scale and the supporting stand for the right rear wheel of FIG. 1.

The preparation of the vehicle for alignment determination or testing (FIG. 1) includes the placement of target scales 40 and 41 adjacent the right rear wheel 13R and the left rear wheel 13L. As seen in FIG. 5, the target scale 40 is slidably supported on a post 42 carried by a bridge 43 and foot rods 44. The foot rods 44 are elongated and have a weight factor sufficient to offset the weight of the target scale 40 which projects in the opposite direction. The scale 40 (FIG. 1) is placed with the foot rods 44 under and straddling the tire 13R, and the scale 40 is slid along the post 42 until it is about opposite the axis of wheel rotation. The bridge 43 is positioned to lie against the side wall of the wheel so as to be generally in the plane of the wheel, and the scale 40 is brought generally into perpendicularity with the wheel.

Figure 6:
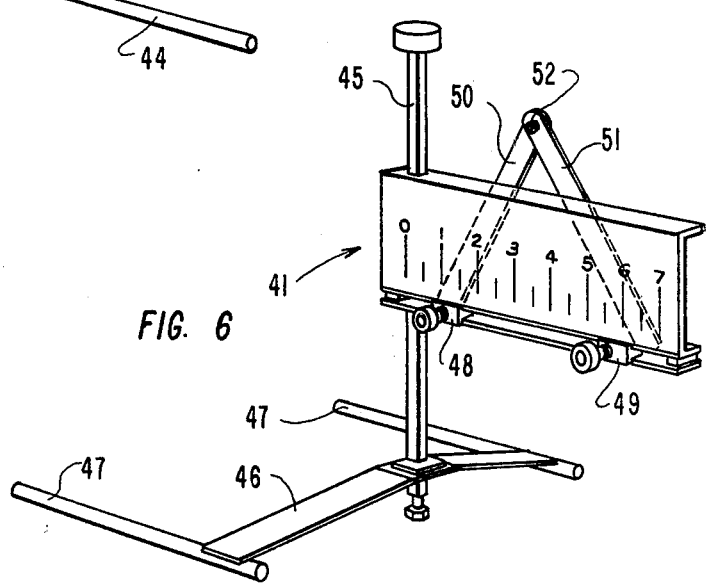
FIG. 6 is a perspective view of the target scale, the computer mechanism, and the supporting stand for the left rear wheel of FIG. 1.

The target scale 41 (FIG. 6) is slidably supported on a post 45 carried by a bridge 46 and foot rods 47. This assembly is placed in position as shown in FIG. 1 adjacent the left rear wheel 13L, and is adjusted as described for the scale 40. Scale 41 is equipped with a mechanical computer for the purpose of taking the guess work out of the adding and dividing process and quickly arriving at an average of the two readings taken from the indicia on the scales 40 and 41. The computer comprises a first slide 48 having an edge arranged to be aligned with a scale mark on the scale 41, a second slide 49 having an edge capable of being aligned with a scale mark first found on the opposite scale 40, and a pair of equal length links 50 and 51 connected to the respective slides 48 and 49 and brought together at a common pivot 52 which fastens the arms for pivoting adjustment as the slides 48 and 49 are moved and which acts as the target for sighting means to be described. The setting of the slides 48 and 49 will position the target pivot 52 at a setting which automatically is the average of the values denoted by the slides.

Again referring to FIGS. 1, 2 and 3, it is seen that the bars 21 and 23 which support the respective monitoring devices in boxes 22 and 24 are located by the heads 19 to be parallel with the plane of the front wheels. Each head has a spirit level 19A which is used to determine when the bars 21 and 23 are level, and clamp nuts 19B on the heads 19 are manipulated to hold the bars in the level positions. Each bar 21 and 23 is provided with sighting means in the form of a pair of fore and aft sighting frames 53 and 54. The frame 53 has a single vertical sighting wire 55 and the outer part of the frame 53 has been broken off to obtain a view of part of the cooperating frame 54 and the pair of sighting wires 56 arranged in crossed relation in that frame. When the eye E (FIG. 1) of the service operator is placed so that the wire 55 in frame 53 is aligned (FIG. 4) with the crossover point of crossed wires 56 in the frame 54, the resulting line of sight S will fall on the target scale 40 and a numbered scale mark will be seen. The eye E of the service operator should then be placed so as to obtain a line of sight S in the same manner through the frames 53 and 54 on bar 23, with the result that a cooperating numbered scale mark will be seen on target scale 41. While eyeball sighting has been shown, it is understood that a light beam can be projected toward the target scales, and when used herein "sighting" or "line of sight" shall include either method of picking out the indicia on the respective scales.

Assuming the numbered mark on scale 41 is 3 and the numbered mark on scale 40 is 5, the slides 48 and 49 respectively will be placed opposite those numbers on scale 41 and the result will place the common pivot target 52 of the computer links 50 and 51 in a position which will align it with the numbered scale mark 4 on scale 41. However it is automatically positioned to be the average without need to look at the scale indicia. Having found the average, the operator must then adjust the front wheel 12L until the sight line S at wheel 12L falls on the target 52 or on mark 4 on scale 41. The result is that the plane of each wheel 12R and 12L is brought to a symmetrical relation with the longitudinal center line Y, thereby obtaining a straight ahead position, and the preliminary phase of the service operation can be considered to be completed. In the following description, the right front wheel 12R will serve as a reference wheel, while the left front wheel 12L will serve as the adjusting wheel. In this context, when the sighting is made along bar 23 to line up of the line of sight S with the computer derived average, the operator will apply a turning force on the wheel 12L or on the turn plate 14 under wheel 12L to swing the bar 23 in the proper direction. It is understood turn plates are not always necessary. This wheel turning adjustment changes the angular relation between the transverse line or cord 26 between the boxes 22 and 23 and the respective bars 21 and 23. These angles are seen at R for the right wheel bar 21 and L for the left wheel bar 23. What has been shown in FIG. 1 is a rectangle having long sides 26 and X and short sides or ends represented by the length of the bars 21 and 23 from the wheel spindles forward to the respective boxes 22 and 24. However, if the right front wheel 12R is set back a distance B (FIG. 1), the rectangle will be distorted and it is the function of the present monitoring apparatus to determine what the set back may be so that an optimum wheel toe can be achieved. Determination of the set back is tested by manipulating the knob 25 (FIG. 7) to move the toe measuring box 24 along its supporting bar 23, and that movement is monitored and displayed in the manner fully disclosed in the said copending application Ser. No. 675,332 now U.S. Pat. No. 4,034,479 issued Apr. 14, 1977, or in U.S. Pat. 3,782,831 issued Jan. 1, 1974.

In accordance with that co-pending application, each of the monitoring means in boxes 22 and 24 is coupled and interrelated by the cord 26 which may or may not be parallel to the spindle axes X for the wheels 12R and 12L. Electronic means contained in the boxes 22 and 24 respond to changes in the angular position the cord 26 moves relative to the fixed references which are bars 21 and 23 which are parallel to the plane of the wheels. The monitoring means in the boxes 22 and 24 are connected into an electronic unit 58 whereby the detection of the angular change is converted into a visual display at meters 59 and 60 representative of the angles formed by the bars 21 and 23 and the reference cord 26.

FIG. 1 shows a power supply 61 leading into a cabinet which contains the electronics 58 and display meters 59 and 60. Lead 62 containing 3 wires extends into box 22 at plug 63, and appropriate circuit connections (not shown) make DC current available so that positive and negative voltage can be fed to the display meter 60. Similarly lead 64 contains 3 wires and connects at plug 65 for box 24 so that DC current is available. It is understood that the display meters 59 and 60 must be able to swing to either side of a zero position in order to properly monitor the position of the steerable wheels 12R and 12L in relation to the values of the angles R and L.

Returning to FIG. 1 and the brief reference made to set back, as the service operator adjusts the left front wheel 12L so the line of sight S falls on the target formed by computer mark 52 he has caused some response in the respective monitoring means in the boxes 22 and 24. If there is set back present, the meters 59 and 60 will not show the same readings. Therefore, the operator must manipulate knob 25 on the end of bar 23 to move box 24 in a direction to produce the same reading on display meters 59 and 60. The amount of adjustment of box 24 required to restore the same meter readings is shown by the scale markings 39 (FIG. 7) and that will reveal the amount of set back. After the front wheel set has been monitored for alignment characteristics the service operator is ready to check center point steering. This check is accomplished by looking at the cross bar of the steering wheel 68, and if it is not symmetrical relative to the vehicle axis Y the wheel must be turned to get it in that centered position. A suitable device is used to hold the steering wheel as adjusted. The turning of the steering wheel 68 will cause a response in the display meters 59 and 60 which usually results in out of balanced readings. Now the service operator has conditioned the vehicle wheels 12R and 12L for center point steering, and the next operation is performed under the vehicle to adjust the tie rod end sleeves (not shown) until the display meters read out the required toe-in for that vehicle. The sleeve adjustment is complete when the meters display similar readings.

Figure 8:
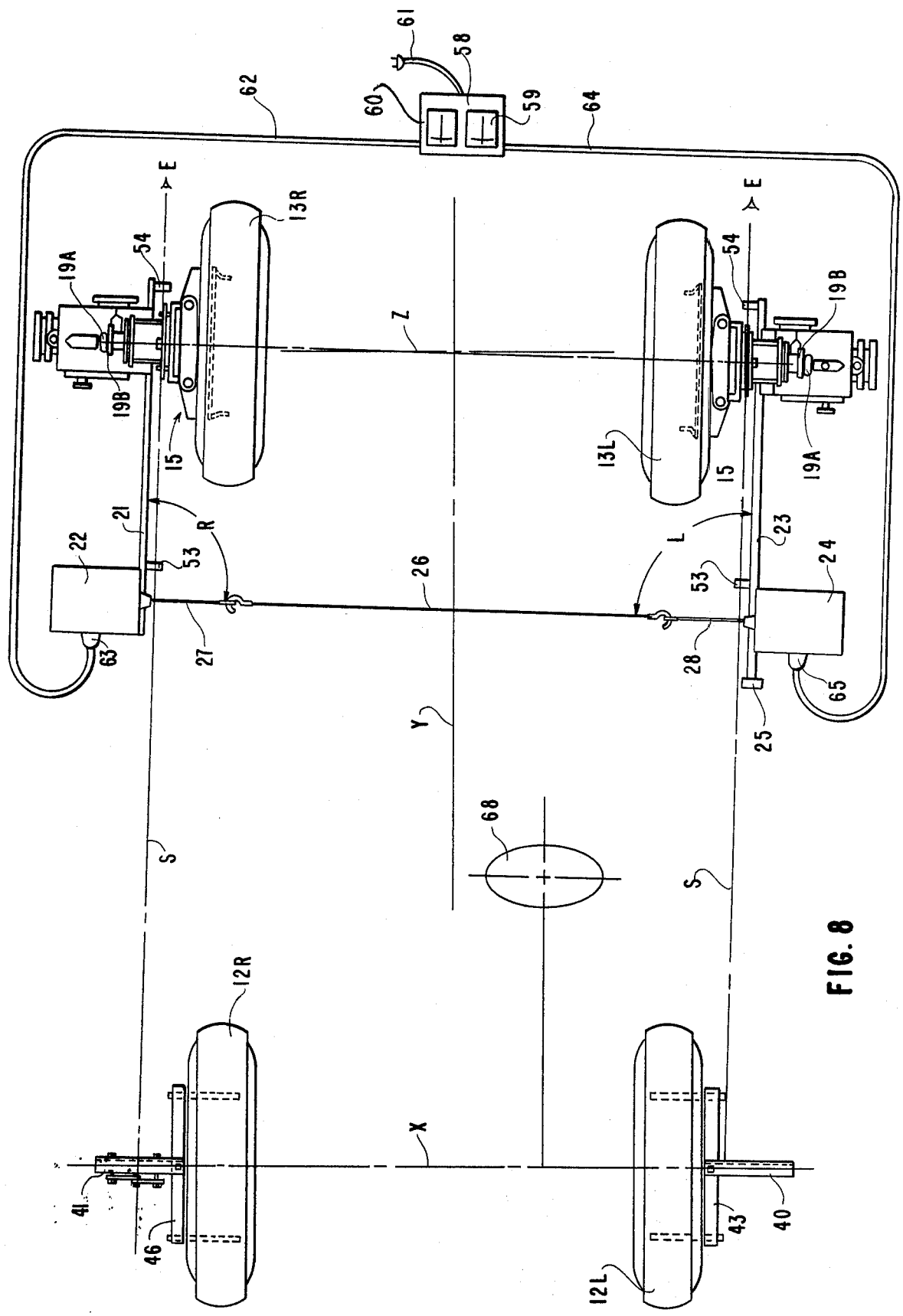
FIG. 8 is a schematic plan view of the vehicle wheels first seen in FIG. 1, but with the various components of the apparatus shown in rearranged operative association for determining the alignment characteristics of the rear wheels.

The foregoing apparatus is equally useful to determine the tracking and other alignment characteristics for the rear wheel set of a vehicle, all as shown in FIG. 8. Once the front steerable wheels 12R and 12L have been adjusted as required for toe-in and center point steering, taking into account set back, the adapters 15 are removed and installed on the right and left rear wheels 13R and 13L. The target scales 40 and 41 are removed and repositioned adjacent the front wheels with the scale 40 crossed over to the left front and scale 41 crossed over the right front so the indicia will be visible when viewed from the rear wheels. The rear wheels are mounted in an axle assembly, of either solid or independent type, represented by the reference line Z so that if there is set back it will usually be due to the skewing or other misalignment of the axle on the frame. This characteristic, as well as toe, it determined in the manner described in connection with FIG. 1 for the front wheels.

For example, the measuring devices in boxes 22 and 24 (FIG. 8) will cause the meters 59 and 60 to reveal the angles between the bar 23 and sight axis S and also between bar 21 and sight axis S. Before reading the meters 59 and 60, the operator must sight from positions E along the bars 21 and 23 through the sighting means 53 and 54 and determine the values seen on the scales 40 and 41. In the example of FIG. 8, the value at scale 40 is less than at scale 41 which indicates that the rear wheels are not tracking with the front wheels. This is corrected by resetting the rear wheel axles until the reading on the scales at the front wheels are equal.

Before the operator makes any rear wheel axle adjustments, a reading at the meters 59 and 60 should be obtained. This reading is obtained when the box 24 is moved to a zero setting at scale 39 (FIG. 7) so that each box 22 and 24 is at the same distance ahead of the axle for its wheel 13R and 13L respectively. Should the meters 59 and 60 read the same that would indicate that the wheels are symetrically aligned relative to the longitudinal axis Y, but not necessarily parallel to each other, as they may be toed in or out relative to each other. If the wheels are toed out relative to each other, the meters should have the pointers in the toe-out scale side of zero, and the angles R and L will be less than 90°. Further, if the meters 58 and 59 do not read the same values, the wheels may have a set back condition, or the wheel toe alignment is not symmetrical relative to the longitudinal axis Y. Adjustment of the knob 25 to bring the meters into the same readings indicate set back is present and the amount of set back is obtained from the indicia 39 (FIG. 7).

When the operator has obtained the readings at the scales 40 and 41, and the readings at meters 59 and 60, the alignment condition of the rear wheels relative to the longitudinal axis Y, and to tracking with the front wheels will become known. Suitable adjustments in the attachment of the axle to the frame can be made to obtain tracking alignment. If the wheel toe alignment is incorrect the alignment can be corrected by bending the axle in the required direction.

What is claimed is:

1. Vehicle wheel alignment determining apparatus for vehicles having spaced apart wheels disposed in first and second sets, there being one set at the front of the vehicle and the other of the sets at the rear of the vehicle with the wheels of each set being on opposite sides of a common longitudinal center line for the vehicle, said apparatus comprising: first and second elongated members, each one including means for mounting the associated member on a wheel of the first set in a position substantially parallel to the plane of rotation of the associated wheel; first and second electrically operable monitoring means mounted on the first and second members, respectively, each for determining the angle between a movable element thereon and the associated support member for that monitoring means; means operatively interrelating the movable elements of said monitoring means to effect simultaneously a response indicative of the angular position of each of said movable elements with respect to the elongated member on which the monitoring means for that movable element is mounted; sighting means carried by each of said first and second members and associated with but independent of each of said monitoring means and being positioned adjacent to said first set of front and rear wheels, each sighting means being aligned to be substantially parallel with the plane of rotation of the associated wheel of said first set of wheels and to be directed toward said second set of wheels; target means positioned adjacent each of said second set of wheels and presenting wheel alignment measuring scales extended horizontally to be viewed by the associated sighting means adjacent said first set of wheels, the values of the measuring scales viewed on said target means by said sighting means being indicative of an alignment characteristic of said first set of wheels; electrical display means located remote from the monitoring means and elongated members and being connected to said electrically operable monitoring means for displaying simultaneously the response of each of said monitoring means; and means for adjusting the position of the first monitoring means forwardly and rearwardly on the first elongated member while the angles determined by the first and second monitoring means are continuously displayed on the electrical display means.

2. The apparatus of claim 1 wherein one of said target means includes a pair of slides movable to positions aligned with the respective values of the indicia viewed by each of said sighting means, equal length links connected to said slides and extending into a common point of contact, and a center target fixing said links together at said common point of contact, said center target being viewable by said sighting means to direct movement of said first set of said front and rear wheels to obtain a corrected alignment position of said first set of wheels.

3. Vehicle wheel alignment determining apparatus for vehicles having at least four wheels arranged in sets spaced apart longitudinally of the vehicle and the wheels of each set being on opposite sides of a common longitudinal center line for the vehicle and from which alignment is to be determined, said apparatus comprising: elongated support means connected to each of a first set of wheels in a position to be parallel with the plane of wheel rotation and to project beyond the wheel perimeter to an outer end; electrically operable wheel position monitoring means mounted on each of said elongated support means in positions adjacent the outer ends so as to be beyond said first set of wheels, said monitoring means including movable elements operatively interconnected so as to be automatically and simultaneously responsive to a change in the angular alignment position of the plane of rotation of said first set of wheels relative to the vehicle center line; means for moving one of the monitoring means forwardly and rearwardly on its elongated support means while each monitoring means continues to monitor the position of the wheel with which it is associated; target means positioned adjacent each of a second set of wheels so as to be spaced longitudinally of the vehicle from said first set of wheels, said target means each having alignment measuring scales with indicia thereon; target sighting means mounted on each of said elongated support means connected to an associated one of said first set of wheels, and each having a line of sight fixed so as to be substantially and continually parallel to the plane of rotation of the associated wheel of said first set of wheels and in position to view the alignment measuring scale indicia on the associated target means adjacent to the second set of wheels, each target sighting means being movable with its associated wheel to follow a change in the angular alignment position of said first set of wheels, whereby said alignment measuring scale indicia on said target means are viewed by said sighting means in determining the straight ahead alignment characteristics of said first set of wheels; and display means located remote from said elongated support means and monitoring means and being connected to said monitoring means to continuously display the response of each monitoring means as angular alignment adjustments are made on the first set of wheels and also as said one monitoring means is moved forwardly and rearwardly on its support means.

4. The apparatus set forth in claim 3, wherein one of said target means also includes means movable to positions representing the values of the indicia sighted on said scales and automatically indicating the average value of said indicia.

5. Vehicle wheel alignment determining apparatus for a vehicle having a pair of front and a pair of rear wheels, said apparatus comprising: target means disposed adjacent the faces of each of a first pair of vehicle wheels, said target means having similar scale indicia thereon presented to face toward the second pair of vehicle wheels; sighting means carried by each of said second pair of vehicle wheels in parallel to the plane thereof and directed to scan said scale indicia on the associated target means and align with selected indicia on said target means; and computer means operatively carried by one of said target means to combine the selected indicia and automatically indicate the value of the average of said selected indicia.

* * * * *